Sept. 25, 1923.

J. L. OPITZ 1,468,669

NARROW TREAD FRONT WHEEL ATTACHMENT FOR TRACTORS

Filed Dec. 5, 1922

Inventor
John L. Opitz
by Orwig & Hague Att'ys

Patented Sept. 25, 1923.

1,468,669

UNITED STATES PATENT OFFICE.

JOHN L. OPITZ, OF CLARINDA, IOWA.

NARROW-TREAD FRONT-WHEEL ATTACHMENT FOR TRACTORS.

Application filed December 5, 1922. Serial No. 605,017.

*To all whom it may concern:*

Be it known that I, JOHN L. OPITZ, a citizen of the United States, and a resident of Clarinda, in the county of Page and State of Iowa, have invented a certain new and useful Narrow-Tread Front-Wheel Attachment for Tractors, of which the following is a specification.

In connection with the use of tractors for agricultural purposes and particularly in connection with the cultivating of tall growing plants, such for instance as corn, the tractors now in general use can be used in such cultivation only during the early period of the growth of such plants, because after the plants have attained the growth of about two feet, then the further use of the ordinary tractor is not possible because it will injure the plants in passing over them, and the farmer is compelled, therefore, to do part of his cultivating with the tractor and then another part with horses, and he is put to the double expense of maintaining a tractor and draft animals.

The object of my invention is to provide a front wheel attachment of simple, durable and inexpensive construction that may be readily, quickly and easily substituted for the front wheel attachment which is provided with a tractor, which front wheel attachment of my improved device is of such narrow tread that it may pass wholly between two of the rows of plants being cultivated, and therefore will not pass over any of the plants so that with this attachment, the plants may be cultivated so long as such cultivation is necessary, and regardless of the height of the plants.

More specifically it is my object to provide an attachment of this class which, not only the front wheels, but all of the other parts of the steering and controlling mechanism for the front wheels, will be contained within the narrow area of the available space between the two rows of the plants being cultivated, and at the same time may be readily, quickly and easily attached to and controlled by the drag link forming part of the steering mechanism of the ordinary tractor; and Further in this connection to provide a device of this kind which will operate with a minimum of friction, and in which adjustment may be readily made to take up wear, and in which the wearing parts are protected against the entrance of dust or foreign matters so that lubrication may be easily maintained.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
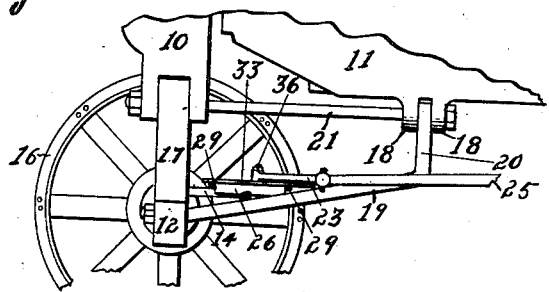
Figure 1 shows a side elevation of a part of a tractor with my improved narrow tread front wheel attachment applied thereto.
Figure 7:
Figure 7 shows a side elevation of one of the felt washers for closing the ends of the ball guide.

Referring to the accompanying drawings, I have used the reference numeral 10 to indicate that portion of the front end of the tractor frame shown, and 11 that portion of the tractor crank case shown.

My improved front wheel attachment comprises an axle 12 made relatively much shorter in length than the front axle ordinarily used. At its ends are rotatively mounted the spindles 13 of the kind in ordinary use, and these spindles are each provided with a rearwardly extended steering arm 14. The two steering arms are connected with the rear ends by a connecting rod 15. On each spindle is mounted a front wheel 16 of ordinary construction, but preferably smaller in diameter than the ordinary front wheels. These wheels are made of such diameter that they may turn to their maximum limit when being steered and pass under the adjacent parts of the crank case or tractor frame.

The axle is provided at its central portion with an upwardly extended member 17, on which the front end of the frame rests, and the crank case is provided with two downwardly extending lugs 18.

For supporting the front axle in its proper position relative to the frame and crank case, and at the same time permitting a swinging movement thereof, I provide radius rods 19, which are provided at their rear ends with an upwardly extended member 20, and a bolt 21 extends through the lugs 18 and the part 20 and also through the frame 10 and the part 17 of the front axle. The front ends of the radius rods are firmly secured to the axle. Near the central portions of the radius rods is a rigid cross brace 22.

For imparting steering movement to the connecting rod 15 I provide a steering lever 23. This lever is fulcrumed at 24 to the cross member 22, and has one arm extending laterally and connected to the drag link 25 of the ordinary steering device. Its other end extends straight forwardly to a point over the connecting rod 15.

Formed on or fixed to the central portion of the connecting rod is a ball guide indicated generally by the reference numeral 26. This ball guide extends forwardly and rearwardly and is formed with a side slot 27 at its top and narrow slots 28 at its ends, and projecting from each end are two lugs 29 on opposite sides of said slots 28. Bolts 30 are extended through said lugs 29 and provided with nuts 31 whereby the lugs may be brought together to thereby move the sides of the ball guide toward each other.

I preferably provide for each of the slots 28 a felt or other yielding washer 32 for the purpose of preventing the entrance of dust and dirt, and for preventing the discharge of lubricating material.

Figures 2, 4:
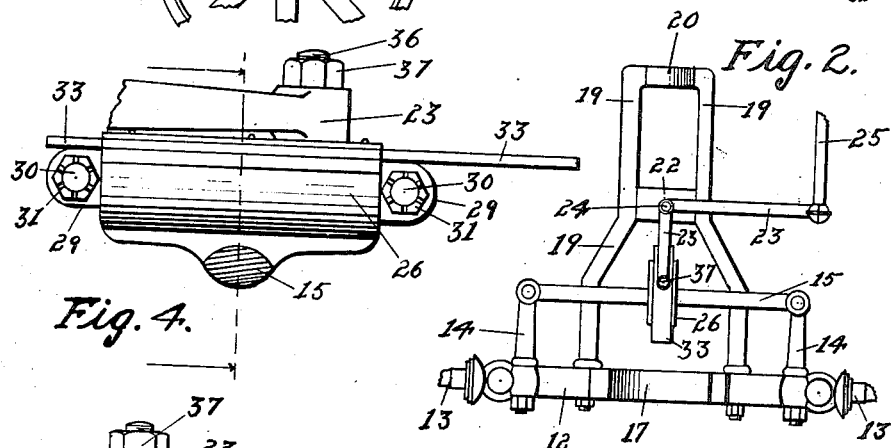
Figure 2 shows a top or plan view of my improved front wheel attachment with the wheels removed and a portion of a drag link connected to the steering lever.
Figure 4 shows a side elevation of the ball guide device for imparting motion from the steering lever to the connecting rod.

In the top of the ball guide there is a sliding dust plate 33 which completely covers the top of the ball guide during the entire movement of the ball therein, and hence its ends project at times beyond the ends of the ball guide, as clearly shown in Figure 4.

Figure 5:
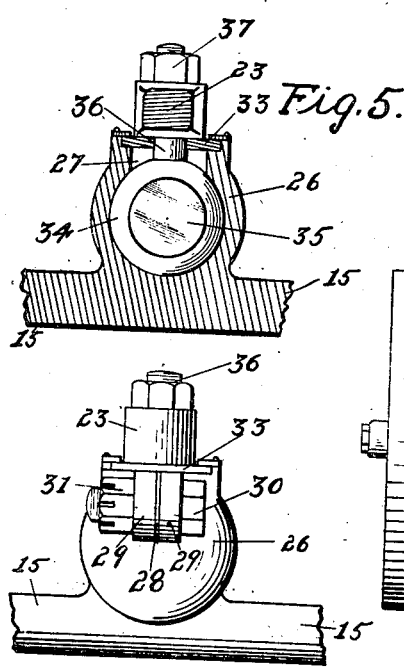
Figure 5 shows a sectional view on the dotted line shown in Figure 4.
Figures 3, 6:
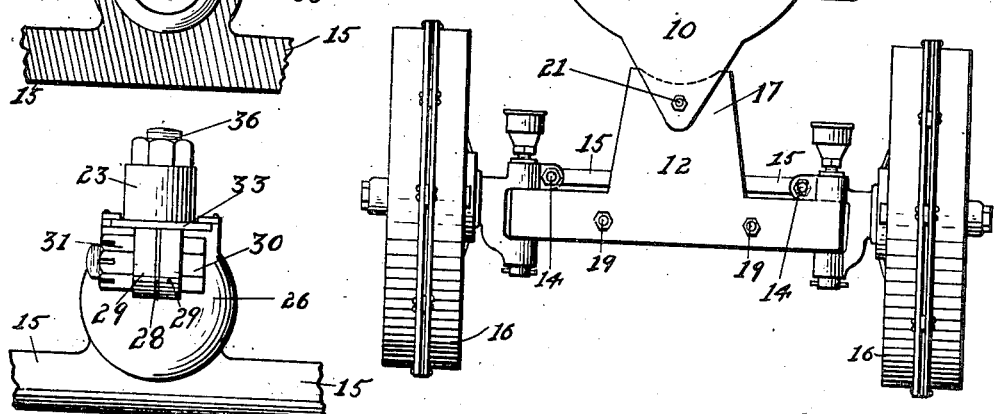
Figure 3 shows a front elevation of a part of a tractor with my improved front wheel attachment applied thereto.
Figure 6 shows an end elevation of the same.

The ball proper is indicated by the reference numeral 34, and is flat on two sides, as shown at 35 in Figure 5. This ball is provided with an upwardly extended arm 36 which projects through an opening in the dust plate 33, and which also extends through the steering lever 23, and is provided with a nut 37 on its upper end.

In assembling this part of the device, the ball is inserted through the slot 27, it being turned so that its flat sides 35 can enter the slot, then it is turned to position at right angles, as shown in Figure 5, and then the dust plate 33 and the steering lever 23 are connected to it, and the nut 37 drawn tight so that the ball can have a partial rotary movement within the ball guide, but will not at any time turn to such position that it can be withdrawn upwardly through the slot 27, during the ordinary steering operations. After the ball is inserted and the other parts assembled, then the nuts 31 are tightened until the ball fits loosely within the ball guide, and may have a free sliding movement and also a free rotary movement through a small part of a circle.

In practical operation and assuming that the device is assembled as shown, then obviously all of the parts of the front of the tractor are contained within the limits of the width of the front wheels, and these are arranged so that both wheels will pass between two rows of plants to be cultivated.

In this connection it should be explained that when my improved device is used on a tractor the rear wheels of the tractor are preferably made wider than the normal wheel tread so that they may straddle the two rows being cultivated, the rear axle being high enough above the ground to pass over the plants being cultivated.

In steering the device the drag link 25 is moved forwardly and rearwardly by the steering wheel in the ordinary way, and the motion thus transmitted to the ball 35 will move the connecting rod in the proper manner, and to the proper extent for the efficient steering of the front wheels. During this movement the ball will slide forwardly and rearwardly in the ball guide, and will partly rotate during such movement.

In view of my improved construction of the steering device it is obvious that the ball may be properly lubricated within the ball guide and the entrance of dust and dirt will be prevented, and in the event that wear takes place, the parts may be tightened and the wear compensated for, by the manipulation of the nuts 31.

Furthermore, when it is desired to take the device apart, this may be readily and quickly accomplished by removing the steering lever from the arm 36, and then turning the arm 36 to a position where the flat sides 35 of the steering ball may pass upwardly through the slot 27 after removing the dust plate 33.

I claim as my invention:

1. An improved narrow tread front wheel attachment for tractors comprising a narrow front axle, spindles mounted on its ends, supporting wheels on said spindles, a steering arm for each spindle, a connecting rod pivoted to the ends of said steering arms, a ball guide fixed to the connecting rod and extended forwardly and rearwardly, a ball slidingly and rotatively mounted therein, a steering lever fulcrumed in the rear of the ball guide and having an end extended forwardly over the ball guide, a ball connected to the said steering lever and mounted within the ball guide, and means for operating the steering lever, for the purposes stated.

2. An improved narrow tread front wheel attachment for tractors comprising a narrow front axle, spindles mounted on its ends, supporting wheels on said spindles, a steering arm extended rearwardly from each spindle, a connecting rod pivoted to the ends of said steering arms, a ball guide fixed to the connecting rod and extended forwardly and rearwardly, said ball guide having a side slot at its top and narrow vertical slots at its ends, and being formed with lugs on the opposite sides of said vertical slots, a bolt passed through said lugs for moving the sides of the ball guide toward each other, a dust plate slidingly and detachably mounted on top of the ball guide, a ball having a flat surface on opposite sides inserted through the slot at the top of the ball guide, and then turned at right angles within the ball guide, said parts being so proportioned that after the ball has thus been turned, it cannot move upwardly through the slot, an arm projected upwardly from the ball and extended through the dust plate, and a steering lever fixed to said arm, for the purposes stated.

3. A narrow tread front wheel attachment for tractors comprising a front axle, steering spindles mounted theron, wheels on said spindles, steering arms extended rearwardly from the spindles, a connecting rod connected to the steering arms, a radius rod device designed to be connected at its rear end to a part of a tractor, and being extended forwardly and fixed to the front axle, a steering lever fulcrumed to the radius rod device, and means connected to the steering lever for imparting motion to the connecting rod.

Des Moines, Iowa, August 10, 1922.

JOHN L. OPITZ.